(12) United States Patent
Bove et al.

(10) Patent No.: US 11,572,046 B2
(45) Date of Patent: Feb. 7, 2023

(54) HYDRAULIC TANK FOR A BICYCLE

(71) Applicant: CAMPAGNOLO S.r.l., Vicenza (IT)

(72) Inventors: Filippo Bove, Padua (IT); Mario Meggiolan, Creazzo (IT)

(73) Assignee: CAMPAGNOLO S.r.l., Vicenza (IT)

( * ) Notice: Subject to any disclaimer, the term of this patent is extended or adjusted under 35 U.S.C. 154(b) by 73 days.

(21) Appl. No.: 17/113,732

(22) Filed: Dec. 7, 2020

(65) Prior Publication Data

US 2021/0179047 A1  Jun. 17, 2021

(30) Foreign Application Priority Data

Dec. 13, 2019  (IT) ........................ 102019000023994

(51) Int. Cl.
*B60T 11/22* (2006.01)
*B62L 3/02* (2006.01)

(52) U.S. Cl.
CPC ............... *B60T 11/22* (2013.01); *B62L 3/023* (2013.01)

(58) Field of Classification Search
CPC ...... B60T 11/228; B60T 11/16; B60T 11/165; B60T 11/26; B60T 11/22; B62L 3/023; B62L 3/02
See application file for complete search history.

(56) References Cited

U.S. PATENT DOCUMENTS

| | | | | |
|---|---|---|---|---|
| 3,344,944 A | * | 10/1967 | Shutt | B60T 11/22 220/325 |
| 4,893,472 A | * | 1/1990 | Barker | B60T 11/22 60/588 |
| 10,082,158 B2 | | 9/2018 | Ruopp | |
| 2008/0060885 A1 | | 3/2008 | Ruckh et al. | |
| 2008/0155982 A1 | | 7/2008 | Jones et al. | |
| 2015/0000267 A1 | | 1/2015 | Ruopp | |
| 2016/0129966 A1 | | 5/2016 | Meggiolan et al. | |
| 2016/0177976 A1 | | 6/2016 | Ruopp | |
| 2017/0002841 A1 | | 1/2017 | Neutsch | |

FOREIGN PATENT DOCUMENTS

| | | | |
|---|---|---|---|
| JP | S 61 110467 U | 7/1986 | |
| JP | H06 42501 U | 6/1994 | |
| TW | 201 033 077 A | 9/2010 | |
| WO | 2015/064647 A1 | 5/2015 | |
| WO | WO-2015064647 A1 | * 5/2015 | .............. B60T 11/22 |

OTHER PUBLICATIONS

Machine Translation of WO2015/064647.*
Italian Search Report and Written Opinion in Italian Application No. 102019000023994, dated Aug. 24, 2020 with English translation.
Italian Search Report and Written Opinion in Italian Application No. 102019000023988, dated Jul. 17, 2020 with English translation.

* cited by examiner

*Primary Examiner* — Thomas E Lazo
*Assistant Examiner* — Daniel S Collins
(74) *Attorney, Agent, or Firm* — Volpe Koenig (57) ABSTRACT

A hydraulic tank for a bicycle that has a compensation chamber within the tank. The tank also has a ventilation hole and a ventilation channel, which is in fluid communication with the ventilation hole, and has an inlet opening arranged on a side wall of the tank.

15 Claims, 5 Drawing Sheets

HYDRAULIC TANK FOR A BICYCLE

CROSS REFERENCE TO RELATED APPLICATION(S)

This application claims the benefit of Italian Application No. 102019000023994, filed on Dec. 13, 2019 which is incorporated herein by reference as if fully set forth.

FIELD OF INVENTION

The present invention relates to a hydraulic fluid tank for use in a control device of a hydraulic brake for a bicycle.

BACKGROUND

In modern bicycles, in particular in high performance bicycles, there is an increasingly use of onboard equipment that uses hydraulic controls. This is the case for example of hydraulic disc brake systems, in which the force necessary to obtain a suitable braking by means of the closing of the brake calipers on the discs is too high to be able to be easily exerted with the usual cable systems, controlled by the hands of the cyclist. With these braking systems, therefore, the force exerted by the hand of the cyclist is transferred to a hydraulic group.

In addition to the disc braking systems, other equipment can also use a hydraulic control. In particular, with reference again to the braking system, hydraulic rim braking systems are also known, in which the brake calipers act on the rim of the bicycle wheel, and not on discs like in the previous case.

Hydraulic brakes, and in particular hydraulic disc brakes, are often preferred to conventional pad brakes because they can ensure a high braking power and are less subject to problems caused by mud or water.

Typically, a disc brake comprises a brake caliper fixed to the frame of the bicycle or to the fork and a brake disc mounted on the hub of the wheel. Inside the brake caliper there is a hydraulic chamber in liquid communication with two opposite jaws, provided with respective friction gaskets (also called simply pads). The brake disc rotates inside the space defined between the two jaws. By bringing the jaws towards the brake disc, friction is generated between the brake disc and the pads and, consequently, the wheel is braked.

In order to move the jaws towards the brake disc it is known to use a control device that comprises a brake lever, a hydraulic cylinder in which a piston kinematically connected to the brake lever is able to slide and a tank in liquid communication with the hydraulic cylinder. The hydraulic cylinder is in liquid communication with a hydraulic chamber associated with the jaws.

By actuating the brake lever the liquid contained in the hydraulic cylinder of the control device is acted upon, the hydraulic cylinder sends pressurized liquid to the hydraulic chamber and the jaws are actuated.

Usually, a deformable membrane is arranged in the tank. The deformable membrane, in combination with a lower surface of the tank, defines a compensation chamber. The membrane has the task of transferring part of the liquid provided inside the tank to the hydraulic cylinder in order to ensure a suitable amount of braking liquid inside the hydraulic chamber also in the case of wearing of the pads. The wearing of the pads indeed causes an increase in volume of the hydraulic chamber that causes an increase in the stroke of the brake lever unless compensated through the aforementioned transfer of liquid from the tank to the hydraulic cylinder.

The compensation chamber therefore changes its volume, through an elastic deformation of the membrane, as a function of the amount of braking liquid provided therein.

In order to allow the membrane to exert an effective pressure on the brake liquid provided in the compensation chamber, the tank is arranged in fluid communication with the outside environment, so that a pressure equal to the atmospheric pressure always acts on the membrane irrespective of the position assumed by the membrane inside the tank (and thus irrespective of the volume of the compensation chamber).

For this purpose, it is known to provide a top wall of the tank with a ventilation hole.

Usually, the control device of a hydraulic brake comprises a support body which the tank, the cylinder and the piston are associated or integrated with. The support body is mounted canti-levered on bicycle handlebars, generally forwards in the direction of travel.

The support body is configured to be gripped by the cyclist to control and manage the bicycle. For this reason, a coating made of a material comfortable to the touch (also called lever cover) is often provided on the support body to offer comfort and safety of grip to the cyclist.

The Applicant has noted that in some circumstances the lever cover could interrupt the fluid communication between ventilation hole of the tank and outside environment.

The Applicant has indeed found that, although the lever covers are arranged so as not to obstruct the ventilation hole, the ventilation hole could in any case become obstructed for example by an anomalous gripping of the lever cover by the cyclist or by a relative displacement between lever cover and support body (for example as a result of an impact or of the pressure exerted by the cyclist's hand on the lever cover) or by an imperfect and imprecise mounting of the lever cover on the support body, or even by dirt, mud and similar.

SUMMARY

The Applicant has perceived that it would be advantageous to be able to have a control device of a hydraulic brake for a bicycle in which the fluid communication between an outside environment and a membrane in the tank is substantially always ensured.

The Applicant's solution provides a hydraulic tank for a bicycle that has an end wall that responds to atmospheric pressure, an opposite end wall that places the tank in liquid communication with a hydraulic cylinder, and a side wall. An elastically deformable membrane extends between the end walls to define a variable compensation chamber having a maximum volume and a minimum volume. The end wall that responds to atmospheric pressure has a ventilation hole in fluid communication with a ventilation channel that has an inlet opening arranged on the side wall of the tank.

BRIEF DESCRIPTION OF THE DRAWINGS

Further features and advantages of the invention will become clearer from the following description of a preferred embodiment thereof, made with reference to the attached drawings. In such drawings.

DETAILED DESCRIPTION OF THE PREFERRED EMBODIMENTS

The present invention provides a hydraulic tank for a bicycle, comprising:

a first wall on which an atmospheric pressure acts;

a second wall opposite to the first wall and configured to place the tank in liquid communication with a hydraulic cylinder;

a side wall that extends between the first wall and the second wall;

an elastically deformable membrane operating between the first wall and the second wall and defining inside the tank a compensation chamber having a volume variable between a maximum volume defined in a condition of maximum expansion of the compensation chamber and a minimum volume defined in a condition of minimum expansion of the compensation chamber;

wherein the first wall of the tank comprises at least one ventilation hole and a ventilation channel which is in fluid communication with the ventilation hole and has a first inlet opening arranged on a first portion of the side wall of the tank.

The membrane deforms inside the tank and reduces or increases the volume of the compensation chamber, thus compensating the wearing of the brake pads.

When the membrane is in the condition of maximum expansion of the volume of the compensation chamber, the membrane is arranged in substantial contact with the top wall of the cover so that the volume of the compensation chamber substantially coincides with the volume of the tank.

When the membrane is in the condition of minimum expansion of the volume of the compensation chamber, the membrane is arranged in substantial contact with the second wall of the tank.

A decrease/increase of the volume of the compensation chamber tends to decrease/increase the pressure inside the portion of tank comprised between the membrane and the top wall of the cover of the tank. Such a tendency is compensated by the entry/exit of air through the ventilation hole provided in the first wall of the tank, which places the outside environment in fluid communication with the volume of the portion of tank comprised between the membrane and the first wall of the tank.

The ventilation channel, by placing the ventilation hole in fluid communication with an inlet opening provided on a portion of the side wall of the tank, makes an alternative ventilation path that allows the ventilation hole to exchange air, between the outside environment and the volume of the portion of tank comprised between the membrane and the first wall of the tank, not only at the first wall of the tank but also at the side wall of the tank.

In this way, possible obstructions of the ventilation hole at the first wall of the tank (for example caused by the lever cover or by dirt) can be compensated through the alternative ventilation path.

In the present description and in the following claims, the expression "in fluid communication with the environment outside the tank" is used to indicate a fluid communication with the atmospheric pressure, i.e. with the environment in which the bicycle moves.

Preferably, the ventilation channel comprises a second inlet opening arranged on a second portion of the side wall of the tank different from the first portion of the side wall of the tank.

This makes it possible to ensure a fluid communication between the outside environment and the volume of the portion of tank comprised between the membrane and the first wall of the tank even in the case in which both the first wall of the tank and the first portion of the side wall of the tank are simultaneously obstructed, thus further increasing the reliability of the tank.

Preferably, the tank has a substantially quadrangular shape, the first portion of the side wall of the tank is defined on a first surface of the side wall of the tank and the second portion of the side wall of the tank is defined on a second surface of the side wall of the tank substantially parallel or perpendicular to the first surface of the side wall of the tank.

This makes it possible to provide substantially three mutually distinct surfaces of the tank in order to ensure that the ventilation hole places the outside environment in fluid communication with the volume of the portion of tank comprised between the membrane and the first wall of the tank. A possible accidental obstruction of the ventilation hole that occurs on one or two distinct surfaces of the tank can be compensated through the inlet opening arranged on the third surface, thus ensuring the correct ventilation through the ventilation hole.

Preferably, the ventilation channel comprises a third inlet opening arranged on a third portion of the side wall of the tank different from the first and second portion of the side wall of the tank.

Preferably, the second surface of the side wall of the tank is substantially perpendicular to the first surface of the side wall of the tank.

Preferably, the third portion of the side wall of the tank is defined on a third surface of the side wall of the tank substantially parallel to the first surface of the side wall of the tank.

Preferably, the ventilation channel is made by a ventilation route arranged in the first wall of the tank between an inner surface and an outer surface of the first wall of the tank.

Preferably, the ventilation route does not project either with respect to the outer surface of the first wall of the tank or with respect to the inner surface of the tank.

Preferably, the ventilation route is open on the outer surface of the first wall of the tank.

This allows the ventilation route to be able to exchange fluid with the outside environment at a relatively large surface and not only at a point or a substantially punctual area of the outer surface of the first wall of the tank.

Preferably, the ventilation channel comprises a bottom surface delimited by opposite side surfaces.

Preferably, the ventilation hole is arranged on the bottom surface of the ventilation channel.

In this way, the ventilation hole lies below the outer surface of the first wall of the tank.

Preferably, the ventilation channel comprises a joining area, a first segment and a second segment, wherein the first segment extends from the joining area up to the first inlet opening and the second segment extends from the joining area up to the second inlet opening.

The first and the second segment of the ventilation channel place the joining area in fluid communication with the first inlet opening and the second inlet opening.

Preferably, the ventilation hole is arranged at the joining area.

Preferably, the ventilation channel comprises a third segment that extends from the joining area up to the third inlet opening.

The third segment of the ventilation channel places the joining area in fluid communication with the third inlet opening.

Preferably, the first wall of the tank comprises a further ventilation hole and a further ventilation channel which is in fluid communication with the further ventilation hole and has a respective first inlet opening arranged on a further first portion of the side wall of the tank.

This makes it possible to further improve the exchange of fluid between the outside environment and the volume of the portion of tank comprised between the membrane and the first wall of the tank, since the further ventilation hole creates a path for the exchange of fluid that is alternative to the one created by the aforementioned ventilation hole.

Preferably, the further first portion of the side wall of the tank is defined on a fourth surface of the side wall of the tank which is parallel to the first surface of the side wall of the tank and perpendicular to the second surface of the side wall of the tank.

In this way, all of the surfaces of the tank are in fluid communication with the aforementioned ventilation hole or with the further ventilation hole, thus minimizing the possibility for the inside of the tank to be insulated from the outside environment.

Preferably, the further ventilation channel comprises a respective second inlet opening arranged on a further second portion of the side wall of the tank.

The second opening of the further ventilation channel is preferably arranged on the same surface of the side wall of the tank on which the second inlet opening of the ventilation channel is arranged.

Preferably, the further ventilation channel comprises a respective third inlet opening arranged on a further third portion of the side wall of the tank which is different from the further first and further second portion of the side wall of the tank.

The third opening of the further ventilation channel is preferably arranged on the same surface of the side wall of the tank on which the third inlet opening of the ventilation channel is arranged.

Preferably, the ventilation hole is arranged close to the first surface of the side wall of the tank and the further ventilation hole is arranged close to the fourth surface of the side wall of the tank.

By placing the ventilation hole and the further ventilation hole away from each other along the first wall of the tank, the possibilities for both the ventilation holes to be simultaneously obstructed are reduced.

Figure 1:
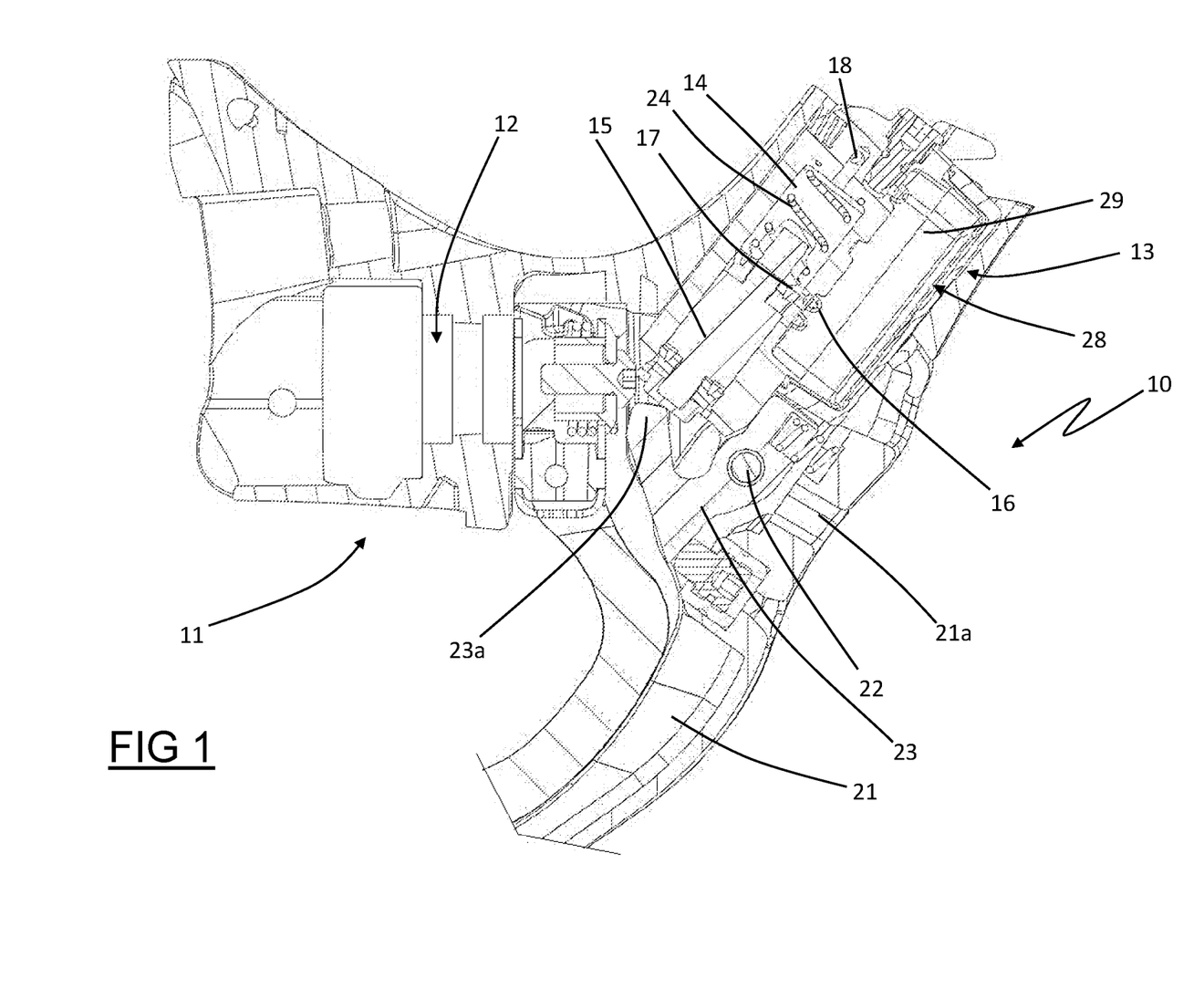
FIG. 1 is a section view of a control device of a hydraulic brake in accordance with an aspect of the present invention.

With reference to FIG. 1, a control device of a hydraulic brake for a bicycle, preferably a high-performance bicycle, is wholly indicated with 10.

The control device 10 is configured to be mounted on bicycle handlebars to control a hydraulically-actuated braking member configured to be mounted on a portion of the frame or on a portion of the fork of the bicycle.

The control device 10 comprises a housing body 11 configured to contain the hydraulic components of the control device.

The housing body 11 can also contain an actuation device of the speed change gear of the bicycle generically indicated with reference numeral 12 and not described any further since it is of the per se known type.

A tank 13 for a liquid, in particular oil, and a hydraulic cylinder 14 are provided inside the housing body 11.

Figure 2:
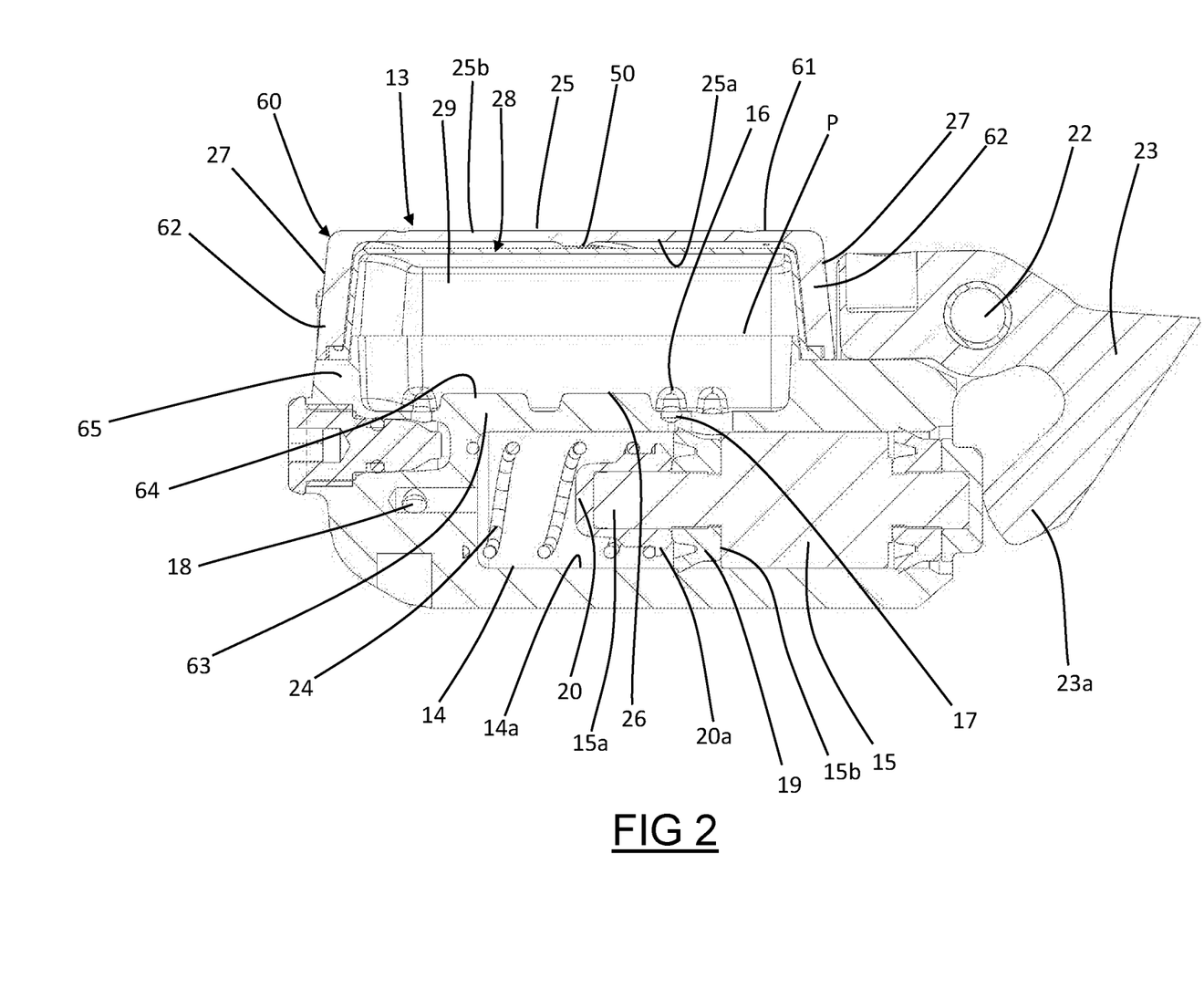
FIG. 2 is a section view of a hydraulic tank of the brake control device of FIG. 1.

The tank 13 comprises an outlet opening 16 which allows the liquid to reach the hydraulic cylinder 14. The hydraulic cylinder 14 comprises an inlet opening 17 which is in liquid communication with the outlet opening 16 of the tank 13 (FIG. 2).

The hydraulic cylinder 14 also comprises an outlet opening 18 configured to be connected directly, or through a connection channel, to a tube which is in turn connected with the braking member.

A piston 15, which is mobile between a first rest condition and a plurality of active positions, is slidably mounted inside the hydraulic cylinder 14.

In the rest position of the piston 15, the inlet opening 17 and the outlet opening 18 of the hydraulic cylinder 14 are in liquid communication, i.e. the liquid provided in the tank 13 can reach the outlet opening 18 of the hydraulic cylinder 14.

In the active positions of the piston 15, the inlet opening 17 and the outlet opening 18 of the hydraulic cylinder 14 are not in liquid communication, in other words the liquid present in the tank 13 cannot reach the outlet opening 18 of the hydraulic cylinder 14.

With this respect, the piston 15 comprises a hydraulic gasket 19 (better illustrated in FIG. 2) constrained to the piston 15 close to a head 15a of the piston 15 and operatively active between the piston 15 and an inner wall 14a of the hydraulic cylinder 14. The head 15a of the piston 15 is substantially shaped like a right prism with substantially constant section, for example cylindrical. In other words, the head 15a of the piston 15 does not have undercuts or holding projections for the hydraulic gasket 19. The hydraulic gasket 19 is fitted through a central hole thereof on the head 15a of the piston 15 and reaches an abutment surface 15b of the piston 15 from which abutment surface the head 15a emerges. A cap 20 that contacts the hydraulic gasket 19 is also inserted on the head 15a of the piston 15, so that the latter is held in position between the abutment surface 15b of the piston 15 and the cap 20.

The hydraulic gasket 19 prevents the liquid provided in the hydraulic cylinder 14 from being able to leak between the inner wall 14a of the hydraulic cylinder 14 and the piston 15, thus ensuring that the piston 15 can transfer a pressure to the liquid provided in the hydraulic cylinder 14 to direct it towards the outlet opening 18 of the latter.

When the piston 15 is in an active position, the hydraulic gasket 19 is positioned between the inlet opening 17 and the outlet opening 18 of the hydraulic cylinder 14, thus interrupting the liquid communication between inlet opening 17 and outlet opening 18.

For this purpose, the inlet opening 17 of the hydraulic cylinder 14 is arranged on a side surface of the inner wall 14a of the hydraulic cylinder 14, in a position such as to be able to be intercepted by the hydraulic gasket 19 during the movement of the piston 15.

During a normal use of the bicycle, the actuation of the piston 15 between the first rest position and one of the second positions takes place by acting on a brake lever 21 of the control device 10.

The brake lever 21 is hinged to the housing body 11 close to an end 21a of the brake lever 21 through a pin 22 (FIG. 1). The brake lever 21 acts on a linkage to push the piston 15 towards the active positions when the brake lever 21 is rotated around the pin 22.

The linkage comprises, in the embodiment exemplified in the figures attached herein, a hammer 23 hinged to the housing body 11 through the same hinge pin 22 of the brake lever 21. A free end 23a of the hammer 23 is in contact with the piston 15, so that a rotation of the hammer 23 causes a thrust on the piston 15.

The brake lever 21 contacts the hammer 23 in a position thereof comprised between the pin 22 and the free end 23a, so that a rotation imparted by the cyclist to the brake lever 21 corresponds to a rotation in the same direction as the hammer 23.

In order to take the piston 15 back towards the rest position, a return mechanism is provided, which comprises a spring 24 active between the piston 15 and the hydraulic cylinder 14. The spring 24 tends to push the piston 15 away from the outlet opening 18 of the hydraulic cylinder 14.

The spring 24 tends to push, through the piston 15, the free end 23a of the hammer 23 and to make it rotate, thus causing an analogous rotation in the same direction as the brake lever 21. Therefore, the piston 15, and the brake lever 21 along with the piston 15, return to the rest position once the braking force exerted by the cyclist on the brake lever 21 stops.

As shown in FIG. 2, the spring 24 contacts the piston 15 at the cap 20, which acts as abutment for the spring 24 itself. For this purpose, the cap 20 comprises a shoulder 20a on which the spring 24 exerts its thrusting action.

The tank 13 comprises a first wall 25, a second wall 26 opposite to the first wall 25 and comprising the outlet opening 16, and a side wall 27 that extends between the first 25 and the second wall 26.

An elastically deformable membrane 28 operating between the first wall 25 and the second wall 26 is provided inside the tank 13. The membrane 28 defines inside the tank 13 a compensation chamber 29 having a variable volume between a maximum volume, reached when the compensation chamber 29 is in a condition of maximum expansion (illustrated in FIG. 2) and a minimum volume, reached when the expansion chamber is in a condition of minimum expansion (not illustrated).

The change in volume of the compensation chamber 29 is determined by the actual amount of fluid contained in the tank 13, which is a function of the degree of wear of the brake pads. In particular, the greater the wear of the brake pads, the lower the amount of fluid present in the tank 13, whereas the lower the wearing of the brake pads, the greater the amount of fluid present in the tank 13. Indeed, greater wearing of the brake pads corresponds to an increase in volume of a hydraulic chamber in fluid connection with the tank 13.

In order to allow the membrane 28 to deform inside the tank 13, and thus to allow the expansion and contraction of the compensation chamber 29, the tank 13 is placed in fluid communication with the outside environment so that the atmospheric pressure can act on the membrane 28.

For this purpose, a ventilation hole 30 (FIG. 6) is provided on the first wall 25 of the tank 13. The ventilation hole 30 passes through the first wall 25 and places the inside of the tank 13 in fluid communication with the outside environment.

Figure 5:
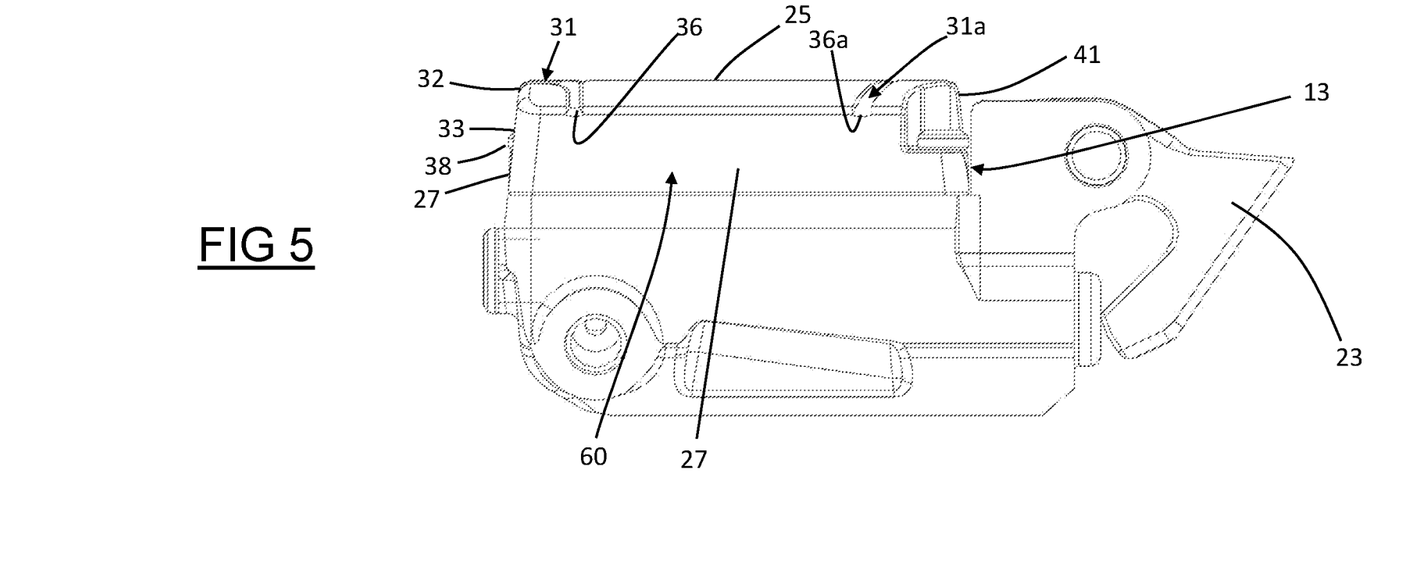
FIG. 5 is a side view of the tank of FIG. 2.
Figure 6:
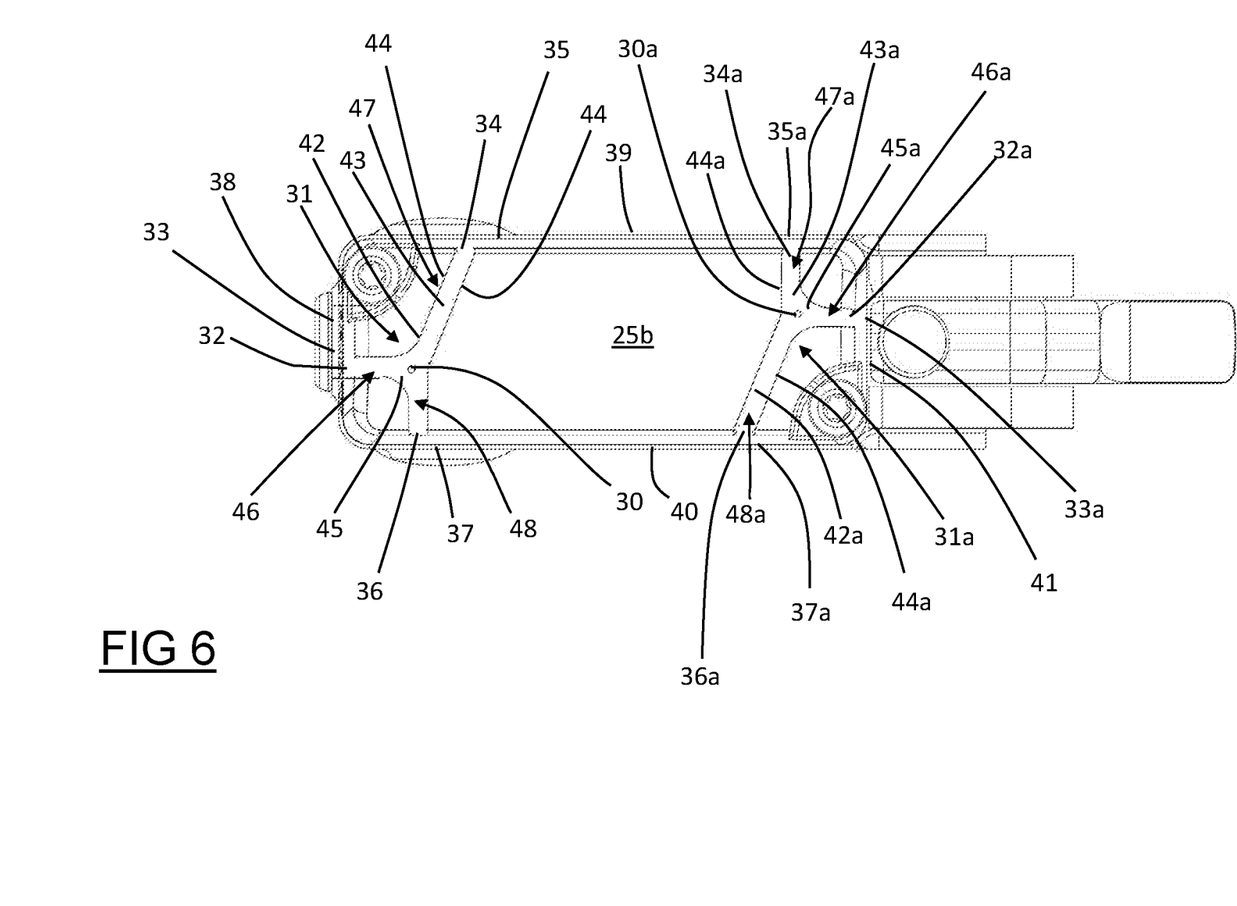
FIG. 6 is a top view of the tank of FIG. 2.

On the first wall 25 of the tank 13 there is also a ventilation channel 31 is also provided. The ventilation channel 31 is in fluid communication with the ventilation hole 30 and comprises a first inlet opening 32 arranged on a first portion 33 of the side wall 27 of the tank 13 (FIGS. 5 and 6).

The ventilation channel 31 comprises a second inlet opening 34 arranged on a second portion 35 of the side wall 27 of the tank 13 different from the first portion 33 of the side wall 27 of the tank 13.

The ventilation channel 31 also comprises a third inlet opening 36 arranged on a third portion 37 of the side wall 27 of the tank 13 different from the first portion 33 and from the second portion 35 of the side wall 27 of the tank 13.

The tank 13 has a substantially quadrangular shape, with the side wall 27 having four surfaces substantially perpendicular to one another and substantially perpendicular to the first wall 25.

In particular, the side wall 27 of the tank 13 comprises a first surface 38, a second surface 39, a third surface 40 and a fourth surface 41. The second 39 and third surface 40 are substantially parallel to one another and the first 38 and fourth surface 41 are substantially parallel to one another, as illustrated in FIG. 6. The first surface 38 is substantially perpendicular to the second surface 39. The first 38 and the fourth surfaces 41 have substantially equal extension and the second 39 and third surface 40 have substantially equal extension. The extension of the first surface 38 is lower than the extension of the second surface 39.

The first portion 33 of the side wall 27 of the tank 13 is arranged on the first surface 38. In particular, the first portion 33 is arranged on the first surface 38 in a position closer to the third surface 40 than to the second surface 39.

The second portion 35 of the side wall 27 of the tank 13 is arranged on the second surface 39. In particular, the second portion 35 is arranged on the second surface 39 in a position closer to the first surface 38 than to the fourth surface 41.

The third portion 37 of the side wall 27 of the tank 13 is arranged on the third surface 40. In particular, the third portion 37 is arranged on the third surface 40 in a position closer to the third surface 40 than to the second surface 39.

The ventilation channel 31 is made by a ventilation route 42 formed in the thickness of the first wall 25 of the tank 13, in particular between an inner surface 25a and an outer surface 25b of the first wall 25.

The ventilation route 42 comprises a bottom wall 43, which defines a bottom surface for the ventilation channel 31. The bottom wall 43 is coplanar with the inner surface 25a of the first wall 25 of the tank 13 so that at the ventilation route 42 no projections directed towards the second wall 26 of the tank emerge from the inner surface 25a of the first wall 25.

The bottom wall 43 is delimited by side surfaces 44 that are opposite to one another and joined to the bottom wall 43 and to the outer surface 25b of the first wall 25 of the tank 13.

The ventilation route 42 is open at the outer surface 25b of the first wall 25 of the tank 13, so that the ventilation channel 31 is made by a groove formed in the first wall 25 of the tank 13.

The ventilation hole 30 is arranged on the bottom surface 43 of the ventilation channel 31, so that it does not reach the outer surface 25b of the first wall 25.

As illustrated in FIG. 6, the ventilation channel 31 comprises a joining area 45 at which the ventilation hole 30 is provided. A first segment 46 that connects the joining area 45, and therefore the ventilation hole 30, with the first inlet opening 32, a second segment 47 that connects the joining area 45, and thus the ventilation hole 30, with the second inlet opening 34 and a third segment 48 that connects the joining area 45, and thus the ventilation hole 30, with the third inlet opening 36 extend from the joining area 45.

In the preferred embodiment of the invention and illustrated in FIGS. 5 and 6, a further ventilation hole 30a that passes through the first wall 25 and places the inside of the tank 13 in fluid communication with the outside environment is provided on the first wall 25 of the tank 13.

A further ventilation channel 31a is also provided on the first wall 25 of the tank 13. The further ventilation channel 31a is in fluid communication with the further ventilation hole 30a. The further ventilation channel 31a is distinct from the ventilation channel 31. The further ventilation channel 31a comprises a first inlet opening 32a arranged on a further first portion 33a of the side wall 27 of the tank 13. The first inlet opening 32a of the further ventilation channel 31a is different from the first inlet opening 32 of the ventilation channel 31.

The further ventilation channel 31a comprises a second inlet opening 34a arranged on a further second portion 35a of the side wall 27 of the tank 13 which is different from the further first portion 33a of the side wall 27 of the tank 13. The second inlet opening 34a of the further ventilation channel 31a is different from the second inlet opening 34 of the ventilation channel 31.

The further ventilation channel 31a also comprises a third inlet opening 36a arranged on a further third portion 37a of the side wall 27 of the tank 13 which is different from the further first portion 33a and from the further second portion 35a of the side wall 27 of the tank 13. The third inlet opening 36a of the further ventilation channel 31a is different from the third inlet opening 36 of the ventilation channel 31.

The further first portion 33a of the side wall 27 of the tank 13 is arranged on the first surface 38. In particular, the further first portion 33a is arranged on the first surface 38 in a position closer to the second surface 39 than to the third surface 40.

The further second portion 35a of the side wall 27 of the tank 13 is arranged on the second surface 39. In particular, the further second portion 35a is arranged on the second surface 39 in a position closer to the fourth surface 41 than to the first surface 38.

The further third portion 37a of the side wall 27 of the tank 13 is arranged on the third surface 40. In particular, the further third portion 37a is arranged on the third surface 40 in a position closer to the second surface 39 than to the third surface 40.

The further first portion 33a is distinct from the first portion 33, just as the further second portion 35a is distinct from the second portion 35 and the further third portion 37a is distinct from the third portion 37.

The further ventilation channel 31a is made by a further ventilation route 42a formed in the thickness of the first wall 25 of the tank 13, in particular between an inner surface 25a and an outer surface 25b of the first wall 25.

The further ventilation route 42a comprises a bottom wall 43a which defines a bottom surface for the further ventilation channel 31a. The bottom wall 43a is coplanar with the inner surface 25a of the first wall 25 of the tank 13 so that at the further ventilation route 42 no projections directed towards the second wall 26 of the tank emerge from the inner surface 25a of the first wall 25.

The bottom wall 43a is delimited by side surfaces 44a that are opposite to one another and joined to the bottom wall 43a and to the outer surface 25b of the first wall 25 of the tank 13.

The further ventilation route 42a is open at the outer surface 25b of the first wall 25 of the tank 13, so that the further ventilation channel 31a is also made by a groove in the first wall 25 of the tank 13.

The further ventilation hole 30a is arranged on the bottom surface 43a of the further ventilation channel 31a, so that it does not reach the outer surface 25b of the first wall 25.

As illustrated in FIG. 6, the further ventilation channel 31a comprises a joining area 45a at which the further ventilation hole 30a is provided. A first segment 46a that connects the joining area 45a, and thus the further ventilation hole 30a, with the further first inlet opening 32a, a second segment 47a that connects the joining area 45a, and thus the further ventilation hole 30a, with the further second inlet opening 34a and a third segment 48a that connects the joining area 45a, and thus the further ventilation hole 30a, with the further third inlet opening 36a extend from the joining area 45a.

Figure 3:
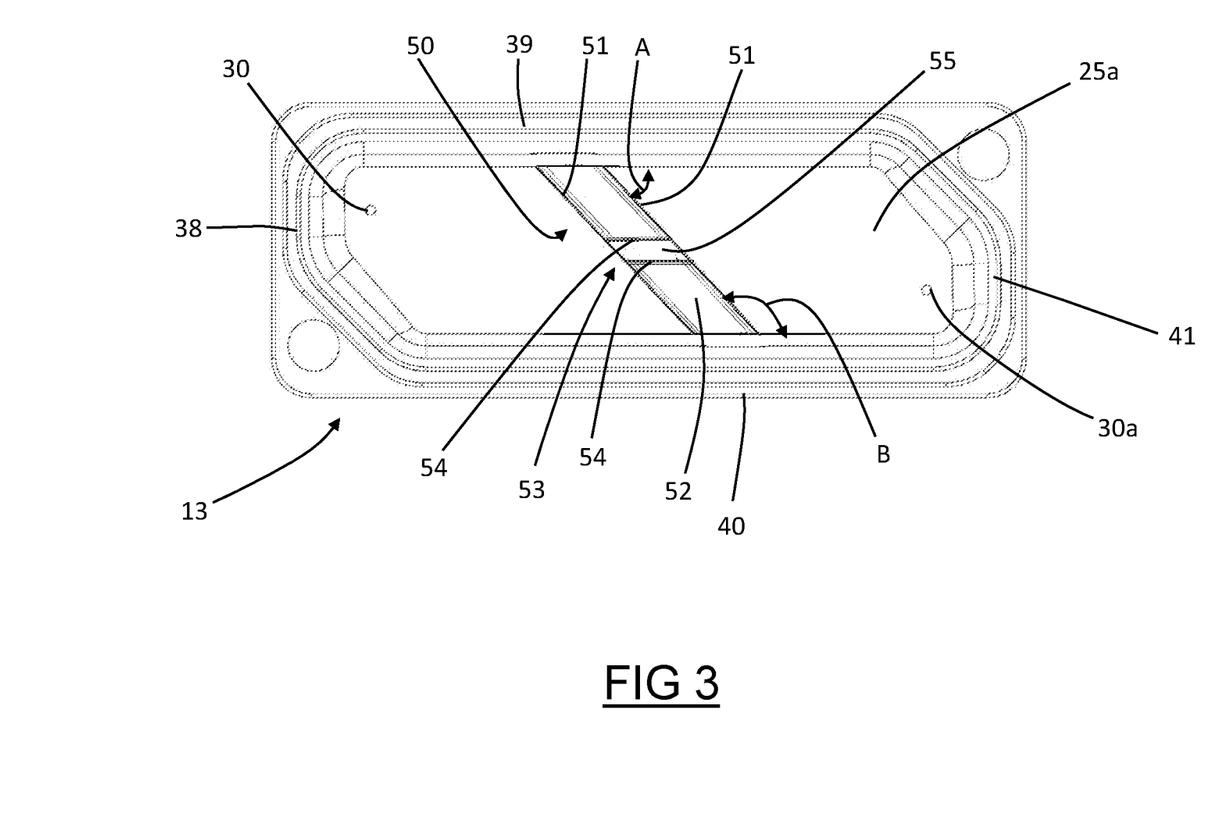
FIGS. 3 and 4 show a detail of the tank of FIG. 2.

As illustrated in FIG. 3, the inner surface 25a of the first wall 25 of the tank 13 comprises a protuberance 50 that projects towards the second wall 26 of the tank 13.

The protuberance 50 is arranged in an area of the first wall 25 not occupied by the ventilation holes 30, 30a and not occupied by the ventilation channels 31, 31a.

The protuberance 50 extends between two opposite surfaces of the side wall 27 of the tank 13. As illustrated in FIG. 3, the protuberance 50 is arranged at a central area of the first wall 25 and divides the two ventilation holes 30, 30a. The protuberance 50 is inclined with respect to the side wall 27.

In particular, the protuberance 50 extends from the second surface 39 to the third surface 40 of the side wall 27 of the tank 13. An angle A is formed between the protuberance 50 and the second surface 39. Such an angle is supplementary to the angle B formed between the protuberance 50 and the third surface 40 of the side wall 27. In other words, the sum of the angle A formed between the protuberance 50 and the second surface 39 and the angle B formed between the protuberance 50 and the third surface 40 is 180°. In the preferred embodiment of the invention, the angle A formed between the protuberance 50 and the second surface 39 is about 45°. The angle B formed between the protuberance 50 and the third surface 40 is about 135°.

As shown in FIG. 3, the protuberance 50 comprises two opposite side walls 51 and a central wall 52 that connects the two side walls 51. The central wall 52 is substantially parallel to the inner surface 25a of the first wall 25 and the two side walls 51 are substantially perpendicular to the inner surface 25a of the first wall 25.

A groove 53 crosses the protuberance 50 and extends between the two side walls 51 of the protuberance 50. The groove 53 is open at the two side walls 51 of the protuberance 50 and comprises two side surfaces 54 substantially parallel to one another. The two side surfaces 54 are substantially parallel to the second surface 39 of the side wall 27 of the tank 13. The two side surfaces 54 extend from a bottom surface 55 that crosses the protuberance 50.

The side surfaces 54 have an extension towards the second wall 26 of the tank 13 that is lower than that of the side walls 51 of the protuberance 50, so that the groove 53 does not reach the inner surface 25a of the first wall 25 of the tank 13.

Figure 4:
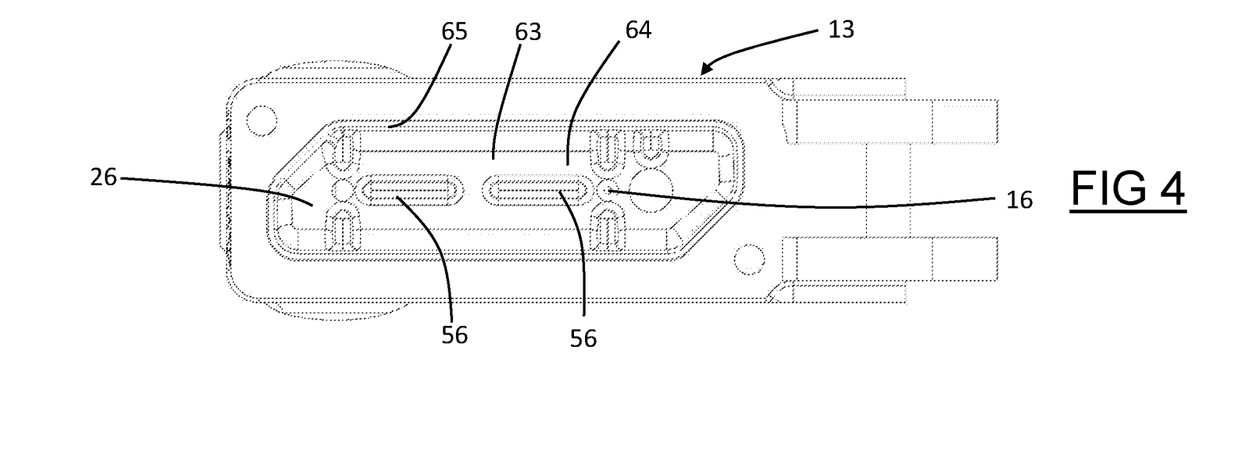

As illustrated in FIG. 4, the second wall 26 comprises a plurality of projections 56 that project towards the first wall 25 of the tank 13.

In the preferred embodiment of the invention, the tank 13 comprises a cover 60 having a first wall 61 and a side wall 62 joined to the first wall 61. The first wall 61 defines the first wall 25 of the tank 13. The side wall 62 of the cover 60 defines a first half-part of the side wall 27 of the tank 13. In particular, the side wall 62 of the cover 60 defines the first surface 38, the second surface 39, the third surface 40 and the fourth surface 41 of the side wall 27 of the tank 13.

The tank 13 also comprises a container 63 comprising a base wall 64 and a side wall 65 joined to the base wall 64.

The side wall 65 extends from the base wall 64 towards the first wall 25 of the tank 13. In particular, the base wall 64 defines the second wall 26 of the tank 13 and the side wall 65 of the container 63 defines a second half-part of the side wall 27 of the tank 13. In particular, the side wall 27 of the tank 13 is defined by the side wall 65 of the container 63 and by the side wall 62 of the cover 60.

Of course, those skilled in the art can bring numerous modifications and variants to the present invention in order to satisfy specific and contingent requirements, all of which are in any case within the scope of protection defined by the following claims.

What is claimed is:

1. A hydraulic tank for a bicycle, the hydraulic tank comprising:
    a first wall subjected to an atmospheric pressure;
    a second wall opposite to the first wall and configured to place the hydraulic tank in liquid communication with a hydraulic cylinder;
    a side wall that extends between the first wall and the second wall;
    an elastically deformable membrane operating between the first wall and the second wall and defining inside the hydraulic tank a variable compensation chamber having a maximum volume defined in a condition of maximum expansion of the compensation chamber and a minimum volume defined in a condition of minimum expansion of the compensation chamber;
    wherein the first wall of the hydraulic tank has at least one ventilation hole in fluid communication with a ventilation channel that has a first inlet opening arranged on a first portion of the side wall of the hydraulic tank;
    wherein the ventilation channel comprises a second inlet opening arranged on a second portion of the side wall of the hydraulic tank different from the first portion of the side wall of the hydraulic tank, and,
    wherein the ventilation channel comprises a third inlet opening arranged on a third portion of the side wall of the hydraulic tank different from the first and second portions of the side wall of the hydraulic tank.

2. The hydraulic tank according to claim 1, wherein the hydraulic tank has a quadrangular shape the first portion of the side wall of the hydraulic tank is defined on a first surface of the side wall of the hydraulic tank and the second portion of the side wall of the hydraulic tank is defined on a second surface of the side wall of the hydraulic tank parallel or perpendicular to the first surface of the side wall of the hydraulic tank.

3. The hydraulic tank according to claim 1, wherein the hydraulic tank has a quadrangular shape, the first portion of the side wall of the hydraulic tank is defined on a first surface of the side wall of the hydraulic tank and the second portion of the side wall of the hydraulic tank is defined on a second surface of the side wall of the hydraulic tank, wherein the second surface of the side wall of the hydraulic tank is perpendicular to the first surface of the side wall of the hydraulic tank and wherein the third portion of the side wall of the hydraulic tank is defined on a third surface of the side wall of the hydraulic tank parallel to the first surface of the side wall of the hydraulic tank.

4. The hydraulic tank according to claim 1, wherein the ventilation channel is made by a ventilation route arranged in the first wall of the hydraulic tank between an inner surface and an outer surface of the first wall of the hydraulic tank.

5. The hydraulic tank according to claim 4, wherein the ventilation route is open on the outer surface of the first wall of the hydraulic tank.

6. The hydraulic tank according to claim 1, wherein the ventilation channel comprises a bottom surface delimited by opposite side surfaces and wherein the ventilation hole is arranged on the bottom surface of the ventilation channel.

7. The hydraulic tank according to claim 1, wherein the ventilation channel comprises a joining area, a first segment and a second segment, wherein the first segment extends from the joining area up to the first inlet opening and wherein the second segment extends from the joining area up to the second inlet opening.

8. The hydraulic tank according to claim 7, wherein the ventilation channel comprises a third inlet opening arranged on a third portion of the side wall of the hydraulic tank different from the first and second portion of the side wall of the hydraulic tank, wherein the ventilation channel comprises a third segment that extends from the joining area up to the third inlet opening.

9. The hydraulic tank according to claim 7, wherein the ventilation hole is arranged at the joining area.

10. A hydraulic tank for a bicycle, the hydraulic tank comprising:
    a first wall subjected to an atmospheric pressure;
    a second wall opposite to the first wall and configured to place the hydraulic tank in liquid communication with a hydraulic cylinder;
    a side wall that extends between the first wall and the second wall;
    an elastically deformable membrane operating between the first wall and the second wall and defining inside the hydraulic tank a variable compensation chamber having a maximum volume defined in a condition of maximum expansion of the compensation chamber and a minimum volume defined in a condition of minimum expansion of the compensation chamber;
    wherein the first wall of the hydraulic tank has at least one ventilation hole in fluid communication with a ventilation channel that has a first inlet opening arranged on a first portion of the side wall of the hydraulic tank;
    wherein the first wall of the hydraulic tank comprises a further ventilation hole and a further ventilation channel in fluid communication with the further ventilation hole and having a respective first inlet opening arranged on a further first portion of the side wall of the hydraulic tank.

11. The hydraulic tank according to claim 2, wherein the first wall of the hydraulic tank comprises a further ventilation hole and a further ventilation channel in fluid communication with the further ventilation hole and having a respective first inlet opening arranged on a further first portion of the side wall of the hydraulic tank, wherein the further first portion of the side wall of the hydraulic tank is defined on a fourth surface of the side wall of the hydraulic tank which is parallel to the first surface of the side wall of the hydraulic tank and perpendicular to the second surface of the side wall of the hydraulic tank.

12. The hydraulic tank according to claim 2, wherein a further first portion of the side wall of the hydraulic tank is defined on a fourth surface of the side wall of the hydraulic tank which is parallel to the first surface of the side wall of the hydraulic tank and perpendicular to the second surface of the side wall of the hydraulic tank, wherein the ventilation hole is arranged close to the first surface of the side wall of the hydraulic tank and a further ventilation hole is arranged close to the fourth surface of the side wall of the hydraulic tank.

13. The hydraulic tank according to claim 10, wherein the further ventilation channel comprises a respective second inlet opening arranged on a further second portion of the side wall of the hydraulic tank and a respective third inlet opening arranged on a further third portion of the side wall of the hydraulic tank different from the further first and further second portion of the side wall of the hydraulic tank.

14. A hydraulic tank for a bicycle, the hydraulic tank comprising:
- a first wall subjected to an atmospheric pressure;
- a second wall opposite to the first wall and configured to place the hydraulic tank in liquid communication with a hydraulic cylinder;
- a side wall that extends between the first wall and the second wall;
- an elastically deformable membrane operating between the first wall and the second wall and defining inside the hydraulic tank a variable compensation chamber having a maximum volume defined in a condition of maximum expansion of the compensation chamber and a minimum volume defined in a condition of minimum expansion of the compensation chamber;
- wherein the first wall of the hydraulic tank has at least one ventilation hole in fluid communication with a ventilation channel that has a first inlet opening arranged on a first portion of the side wall of the hydraulic tank, the ventilation channel is made by a ventilation route arranged in the first wall of the hydraulic tank between an inner surface and an outer surface of the first wall of the hydraulic tank, and the ventilation route is open on the outer surface of the first wall of the hydraulic tank.

15. A hydraulic tank for a bicycle, the hydraulic tank comprising:
- a first wall subjected to an atmospheric pressure;
- a second wall opposite to the first wall and configured to place the hydraulic tank in liquid communication with a hydraulic cylinder;
- a side wall that extends between the first wall and the second wall;
- an elastically deformable membrane operating between the first wall and the second wall and defining inside the hydraulic tank a variable compensation chamber having a maximum volume defined in a condition of maximum expansion of the compensation chamber and a minimum volume defined in a condition of minimum expansion of the compensation chamber;
- wherein the first wall of the hydraulic tank has at least one ventilation hole in fluid communication with a ventilation channel that has a first inlet opening arranged on a first portion of the side wall of the hydraulic tank, and the ventilation channel comprises a bottom surface delimited by opposite side surfaces and wherein the ventilation hole is arranged on the bottom surface of the ventilation channel.

* * * * *